(Model.) 2 Sheets—Sheet 2.

J. G. FRIEDEMANN.
HARROW OR DRAG.

No. 257,441. Patented May 2, 1882.

Witnesses. Inventor.

UNITED STATES PATENT OFFICE.

JOHANN G. FRIEDEMANN, OF WAVERLY, ASSIGNOR TO AUGUST FRIEDEMANN, OF BREMER COUNTY, IOWA.

HARROW OR DRAG.

SPECIFICATION forming part of Letters Patent No. 257,441, dated May 2, 1882.

Application filed May 3, 1881. (Model.)

*To all whom it may concern:*

Be it known that I, JOHANN G. FRIEDEMANN, a citizen of the United States, residing at Waverly, in the county of Bremer and State of Iowa, have invented a new and useful Improvement in Harrows or Drags, of which the following is a specification.

The object of this invention is to provide a sectional harrow of such construction that it may be readily folded and transported; and the invention consists in the combination of parts, hereinafter described, and pointed out in the claim.

Figure 1:
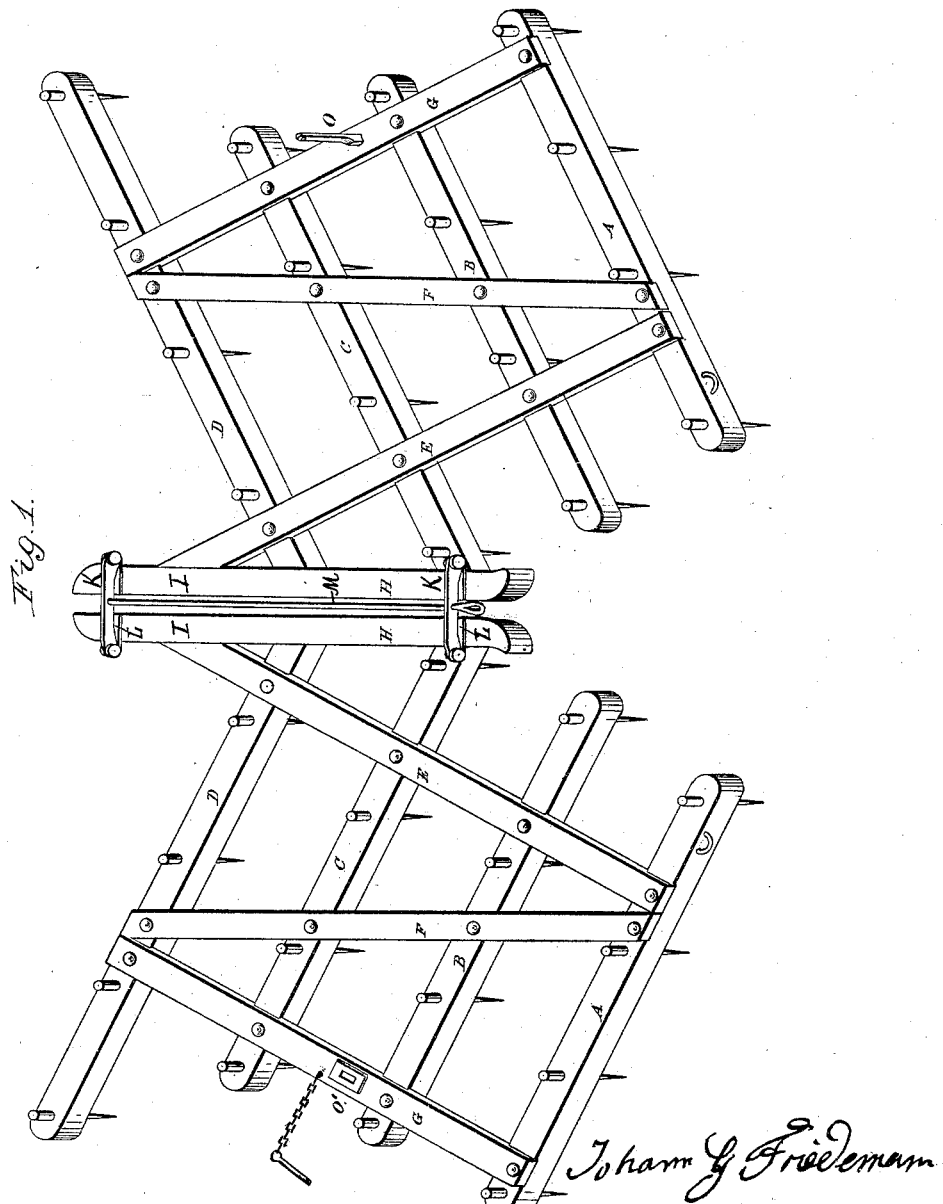
Figure 2:
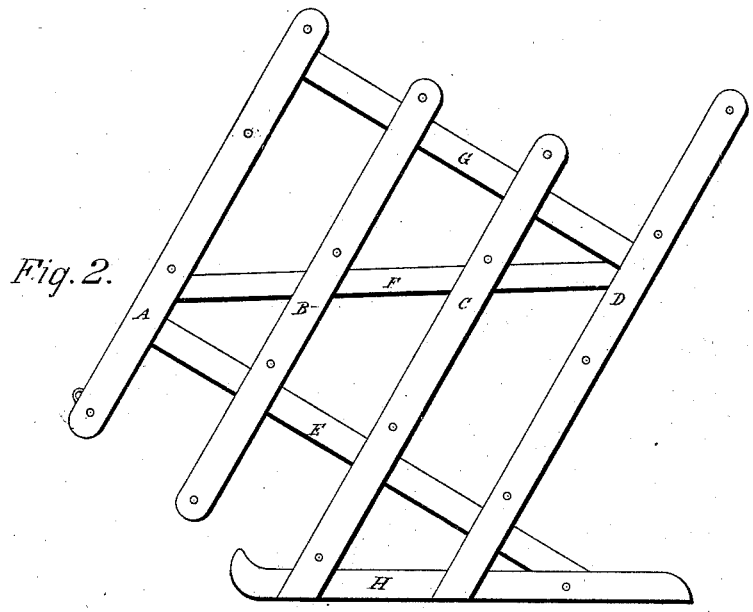
Figure 3:
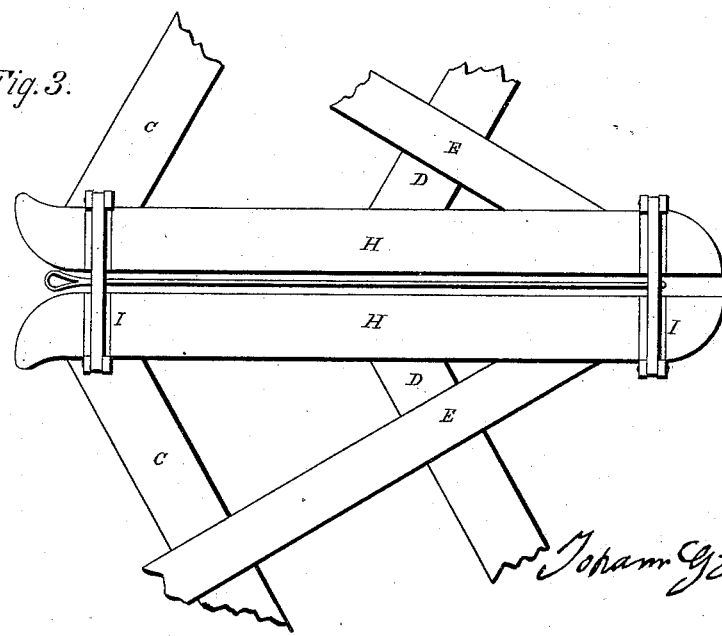

In the drawings, Figure 1 is a perspective view of a harrow constructed in accordance with my invention. Fig. 2 represents one of the harrow-sections detached, and Fig. 3 is a plan view with parts of the harrow-sections broken away.

The harrow consists of two sections of similar construction, having any desired number of beams, A B C D, secured together by cross-ties E, F, and G. The inner ties, E, are secured at one end, I, to two parallel runner-beams, H H, hinged together by coupling-bars K K, which latter are pivoted in eye-plates L L on the outer edges of the runner-beams H H, and said coupling-bars are connected by a draft-rod, M, passing through said bars in line with the runner-beams. The latter are arranged at a short distance apart, and when the harrow is folded for transportation they are still further separated by reason of the hinging of the coupling-bars on the outer edges thereof, so that a wide base is given the harrow in its folded position, which will prevent overturning.

When it is desired to move the harrow from one place to another the two sections may be turned up, so as to rest upon the beams H H, which will form slides or runners upon which the harrow may be readily moved, the front ends of said beams being made with curved faces. These runners H H may be made to stand from one to one and a half foot apart by the described hinging of the bars K.

The sections, when in raised or folded position, may be locked together by means of the locking-pin O, socket O', and a wedge-pin and chain, or in any other suitable manner.

The drag-bar M admits of the attachment of a team to transport the harrow.

I am aware that it is not broadly new to construct a harrow of two or more folding sections to adapt them to be transported. I therefore do not claim such a construction broadly; but

What I claim is—

In a sectional harrow, the combination, with the beams A B C D, of runner-beams H H, bearing eye-plates L, the coupling-bars K, hinged to said eye-plates on the outer edges of said beams H, and a locking device, substantially as described.

In testimony that I claim the foregoing I have hereunto set my hand this 21st day of January, 1882.

JOHANN G. FRIEDEMANN.

Witnesses:
 A. F. BROWN,
 A. FRIEDEMANN.